US006798875B2

(12) United States Patent
DuCharme

(10) Patent No.: US 6,798,875 B2
(45) Date of Patent: Sep. 28, 2004

(54) METHOD AND SYSTEM FOR REROUTING TELEPHONE CALLS DIRECTED TO A PRIVATE BRANCH EXCHANGE VIA A PRIVATE CORPORATE NETWORK

(75) Inventor: Joseph Francis DuCharme, Burnt Hills, NY (US)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 09/683,373

(22) Filed: Dec. 19, 2001

(65) Prior Publication Data

US 2003/0112953 A1 Jun. 19, 2003

(51) Int. Cl.[7] .............................................. H04M 1/00
(52) U.S. Cl. .............................. 379/211.02; 379/221.03; 379/221.04; 379/232
(58) Field of Search ........................... 379/211.02, 279, 379/221.03, 221.04, 221.05, 232, 211.01, 212.01, 265.01–265.14

(56) References Cited

U.S. PATENT DOCUMENTS

| | | | | |
|---|---|---|---|---|
| 4,488,004 A | * | 12/1984 | Bogart et al. .................. 179/18 |
| 5,031,211 A | * | 7/1991 | Nagai et al. ................. 379/221 |
| 5,455,855 A | * | 10/1995 | Hokari ......................... 379/229 |
| 5,483,589 A | * | 1/1996 | Ishida et al. ................. 379/220 |
| 5,533,109 A | * | 7/1996 | Baker .......................... 379/201 |
| 5,670,950 A | * | 9/1997 | Otsuka .................. 340/825.33 |
| 5,784,449 A | * | 7/1998 | Ardon ......................... 379/230 |
| 5,787,355 A | * | 7/1998 | Bannister et al. ............ 455/458 |
| 5,825,858 A | * | 10/1998 | Shaffer et al. ............... 379/120 |
| 5,875,242 A | * | 2/1999 | Glaser et al. ................ 379/207 |
| 5,911,123 A | * | 6/1999 | Shaffer et al. .............. 455/554 |
| 6,044,143 A | * | 3/2000 | Su ............................... 379/225 |
| 6,330,323 B1 | * | 12/2001 | Gottlieb et al. ......... 379/220.01 |
| 6,366,668 B1 | * | 4/2002 | Borst et al. ............. 379/266.04 |
| 6,424,700 B1 | * | 7/2002 | Thibon et al. ............ 379/32.04 |
| 6,564,054 B1 | * | 5/2003 | Imafuku ...................... 455/432 |
| 6,571,108 B1 | * | 5/2003 | Otsuka et al. .............. 455/555 |
| 2003/0181209 A1 | * | 9/2003 | Forte | |

FOREIGN PATENT DOCUMENTS

| | | | |
|---|---|---|---|
| JP | 7-123455 | * | 5/1995 |
| WO | WO 98/14844 | * | 4/1998 |
| WO | WO 98/15104 | * | 4/1998 |

* cited by examiner

Primary Examiner—William J. Deane, Jr.
(74) Attorney, Agent, or Firm—Armstrong Teasdale LLP

(57) ABSTRACT

A method of rerouting telephone calls directed to a private branch exchange (PBX) located at a first site to a second site wherein the PBX has at least one nonfunctional routing number is provided. The method includes providing a corporate long distance telephone system, providing a telephone hunt group, programming a plurality of routing numbers assigned to the first site PBX such that calls directed to the first site PBX are routed through the corporate long distance telephone system to the telephone hunt group, programming the hunt group to forward calls to a dedicated long distance telephone system, and programming the dedicated long distance telephone system to route calls to at least one of an alternate PBX and a dedicated wireless telephone system located at the second site.

28 Claims, 3 Drawing Sheets

METHOD AND SYSTEM FOR REROUTING TELEPHONE CALLS DIRECTED TO A PRIVATE BRANCH EXCHANGE VIA A PRIVATE CORPORATE NETWORK

BACKGROUND OF INVENTION

This invention relates generally to a method and system for routing telephone calls and, more particularly, to a method and system for rerouting telephone calls directed to a private branch exchange via a private corporate telephone network.

At least some companies having offices at various locations utilize a private branch exchange (PBX) for handling incoming and outgoing telephone calls. A PBX is a telephone controller that switches calls between users on internal lines while allowing all users to share a certain number of external phone lines. A PBX eliminates requiring an external line for each user. In addition, in a company telephone system that utilizes a PBX, an employee located in State A can call another employee located in State B by using a routing number assigned to the employee located in State B on the company PBX. By so doing, the State A employee can speak to the State B employee over the telephone.

Rearranging telephone routing in a PBX, however, may create havoc for a company that utilizes a PBX for handling incoming telephone calls. A company that utilizes a PBX may be required to rearrange these telephone calls if, for example, a telecommunication disaster occurs at one of its facilities that utilizes a PBX. For example, if a company has a central help center that utilizes a PBX for incoming telephone calls and the company help center is located in an area where a telecommunication disaster occurs which renders the PBX routing numbers assigned to the help center nonfunctional, then an employee trying to contact the company help center will be unable to so through the PBX. Thus, an employee requiring assistance from the company help center will be unable to receive the needed assistance unless the telephone call directed to the company help center is rerouted to an appropriate person. The company can lose both time and money when its employees are unable to receive or are delayed in receiving such assistance.

SUMMARY OF INVENTION

In one aspect, a method of rerouting telephone calls directed to a private branch exchange (PBX) located at a first site to a second site wherein the PBX has at least one nonfunctional routing number is provided. The method includes providing a corporate long distance telephone system, providing a telephone hunt group, programming a plurality of routing numbers assigned to the first site PBX such that calls directed to the first site PBX are routed through the corporate long distance telephone system to the telephone hunt group, programming the hunt group to forward calls to a dedicated long distance telephone system, and programming the dedicated long distance telephone system to route calls to at least one of an alternate PBX and a dedicated wireless telephone system located at the second site.

In another aspect, a method of rerouting telephone calls directed to a private branch exchange (PBX) located in a designated disaster area to an alternate site is provided. The PBX has at least one nonfunctional routing number. The method includes providing a corporate long distance telephone system, providing a bank of telephones configured in a hunt group, programming a plurality of routing numbers assigned to the PBX located in the disaster area such that calls directed to the PBX located in the disaster area are routed through the corporate long distance telephone system to the bank of hunt group telephones, programming the bank of hunt group telephones to forward calls to a dedicated long distance telephone system, and programming the dedicated long distance telephone system to route calls to at least one of an alternate PBX and a dedicated wireless system located at the alternate site such that a designated person receives the calls.

In another aspect, a telephone routing system for rerouting telephone calls directed to a private branch exchange (PBX) located at a first site to a second site is provided. The first site PBX has at least one nonfunctional routing number. The system includes a corporate long distance telephone system, a bank of telephones configured in a hunt group, a dedicated long distance telephone system, and at least one of an alternate PBX and a dedicated wireless system located at said second site.

In another aspect, a telephone routing system for rerouting telephone calls directed to a private branch exchange (PBX) located in a disaster site area to an alternate site is provided. The disaster site PBX having a plurality of routing numbers assigned thereto and at least one routing number designated as nonfunctional. The system includes a corporate long distance telephone system, a bank of telephones configured in a hunt group, a dedicated long distance telephone system, and at least one of an alternate PBX and a dedicated wireless system located near the alternate site. The system is configured to reroute calls directed to the disaster site PBX through the corporate long distance telephone system to the bank of hunt group telephones, forward calls to the dedicated long distance telephone system, and route calls to at least one of the alternate PBX and the dedicated wireless system located near the alternate site.

DETAILED DESCRIPTION

Figure 1:
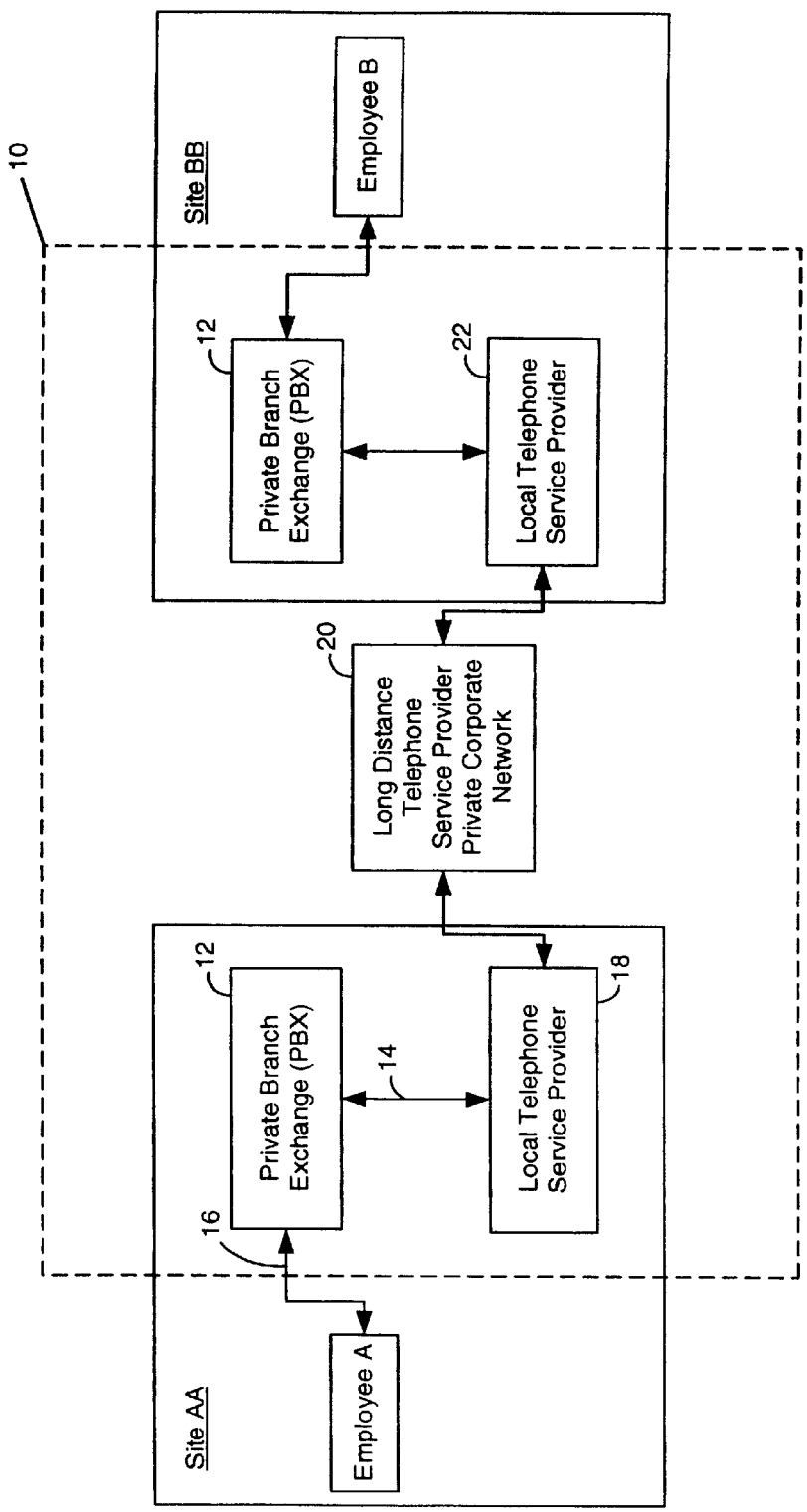
FIG. 1 is a block diagram illustrating a known telephone system between Employee A located at Site AA and Employee B located at Site BB including a private branch exchange (PBX).

FIG. 1 is a block diagram illustrating a known telephone system 10 between an Employee A located at a Site AA and an Employee B located at a Site BB which includes a private branch exchange (PBX) 12. A PBX is a telephone controller typically utilized within medium-sized to large-sized businesses that switches calls between users on internal lines while allowing all users to share a certain number of external phone lines. A PBX eliminates requiring an external line for each user. In the exemplary embodiment, Employee A located at Site AA places a telephone call 14 by entering a routing number 16 into a telephone that is representative of a number assigned to Employee B on PBX 12. In the exemplary embodiment, telephone call 14 is a long-distance telephone call. In other words, Employee A places a long distance telephone call 14 to Employee B by entering into a telephone routing number 16 assigned to Employee B within PBX 12, and as such Employee A does not have to enter an area code and telephone number that are typically entered to contact Employee B by telephone by a party outside PBX 12.

In the exemplary embodiment, telephone call 14 from Employee A is routed through PBX 12 to a telephone service provider 18 that is local to Employee A at Site AA. Local telephone service provider 18 then routes telephone call 14 through a long distance telephone service provider 20. In the exemplary embodiment, long distance telephone service provider 20 is a private, corporate, long distance telephone network. Long distance provider 20 routes telephone call 14 to a telephone service provider 22 that is local to Employee B located at Site BB. Local telephone service provider 22 then routes telephone call 14 to Employee B through PBX 12 at Site BB to connect Employee A with Employee B.

In at least one embodiment, telephone system 10 connects Employee A with a company-wide help center located at Site BB. The company-wide help center utilizes PBX 12 for handling incoming telephone calls. The company-wide help center is configured to provide assistance to employees within the company on a variety of matters. If, for example, an employee requires assistance on a certain matter, the employee can initiate telephone call 14 by entering routing number 16 that is assigned to the company help center to discuss the matter at issue with the help center. Telephone call 14 from Employee A is routed through PBX 12 to local telephone service provider 18. Local telephone service provider 18 then routes telephone call 14 through long distance telephone service provider 20, which, in the exemplary embodiment, is a private corporate telephone network. Long distance provider 20 routes telephone call 14 to local telephone service provider 22. Local telephone service provider 22 then routes telephone call 14 to the company help center through PBX 12. In another embodiment, telephone system 10 connects Employee A with an accounting department, a health service department, or other such department within the company that utilizes a PBX for handling incoming calls.

Unfortunately, a company that utilizes a PBX may experience telephone routing problems. More specifically, in at least some known cases, a routing number assigned to an employee within a PBX can become nonfunctional. When a PBX routing number becomes nonfunctional, telephone calls directed to an employee with the nonfunctional PBX routing number must be rerouted to an alternate location until the routing number becomes functional again. If a plurality of PBX routing numbers become nonfunctional, a company can experience a variety of rerouting problems. More specifically, a company that utilizes a PBX may be required to rearrange numerous telephone calls directed through the PBX if, for example, a telecommunication disaster occurs at one of its facilities that utilizes the PBX. Such a telecommunications disaster may create havoc and mass confusion within a company.

Figure 2:
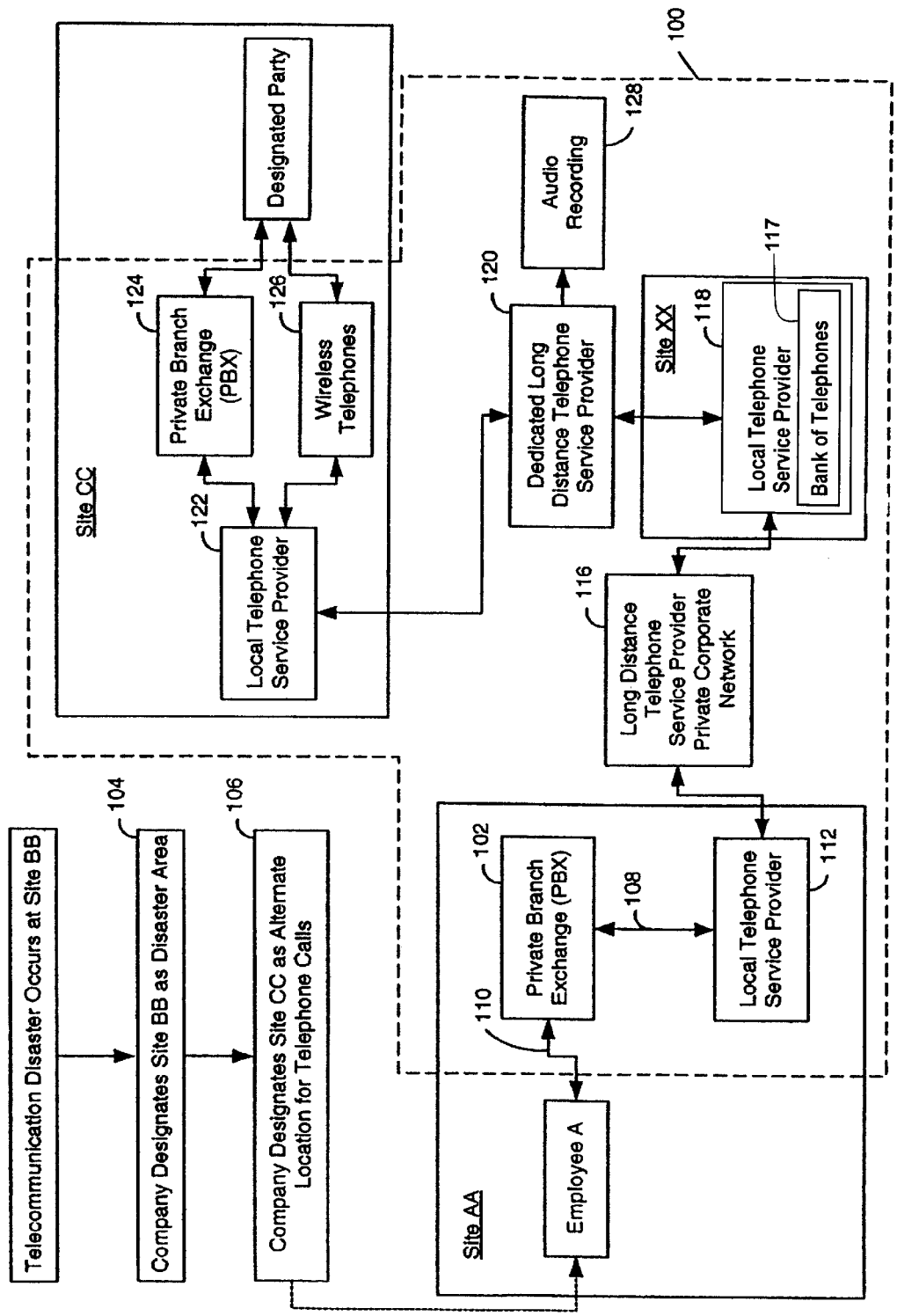
FIG. 2 is a block diagram illustrating an exemplary embodiment of a telephone system that routes a telephone call through a PBX from Employee A located at Site AA directed to an employee located at Site BB to a designated party located at Site CC after a disaster occurs at Site BB.

FIG. 2 is a block diagram illustrating an exemplary embodiment of a telephone system 100 that routes telephone calls through a PBX 102 from Employee A located at Site AA directed to an employee located at Site BB to a designated party located at Site CC after a disaster has occurred at Site BB. In the exemplary embodiment, a telecommunication disaster occurs at Site BB and the company designates Site BB as a disaster area 104. The company then designates Site CC as an alternate location 106 for the telephone calls that are directed to Site BB through PBX 102. In other words, all telephone calls directed to Site BB through nonfunctional routing numbers within PBX 102 are redirected to alternate location Site CC.

In the exemplary embodiment, without knowing that Site BB has been designated disaster area 104, Employee A located at Site AA places a telephone call 108 to an employee located at Site BB by entering a routing number 110 assigned to the employee within PBX 102. However, because of the disaster at Site BB, routing number 110 assigned to the employee at Site BB is no longer functional, and rather telephone call 108 is rerouted to designated Site CC so that telephone call 108 can be received by a designated person. More specifically, in the exemplary embodiment, telephone call 108 from Employee A is routed through PBX 102 to a local telephone service provider 112 which is local to Employee A at Site AA. Local telephone service provider 112 then routes telephone call 108 through a long distance telephone service provider 116. In the exemplary embodiment, long distance telephone service provider 116 is a private, corporate, long distance telephone network. Long distance telephone service provider 116 then routes telephone call 108 to a bank 117 of telephones located at a local telephone service provider 118 at Site XX. In the exemplary embodiment, Site XX can be any location where long distance telephone service provider 116 can route telephone call 108 to a local telephone service provider. The bank of telephones 117 located at local telephone service provider 118 at Site XX are configured as a hunt group. A hunt group includes a plurality of assigned routing numbers grouped in a prearranged ordered list. When a telephone call comes in to a telephone in a hunt group and the telephone is busy, a switch will hunt through the assigned routing numbers until an idle routing number is located and then connects the telephone call to that idle number. Local telephone service provider 118 then routes telephone call 108 through a dedicated long distance telephone service provider 120. In the exemplary embodiment, dedicated long distance telephone service provider 120 is a toll-free, long distance telephone service provider which routes telephone call 108 to a local telephone service provider 122 located at alternate location Site CC. Local telephone service provider 122 then routes telephone call 108 to at least one of another PBX 124 located at Site CC, or to one of a plurality of wireless telephones 126 that are configured into at least one hunt group. Employee A is then able to speak via the telephone with a designated party at designated alternate location Site CC.

Additionally, in the exemplary embodiment, when telephone call 108 is routed to dedicated long distance telephone service provider 120, an audio recording 128 is provided to Employee A. In at least one embodiment, audio recording 128 advises the caller that Site BB has been designated a disaster area 104, and that their telephone call is being rerouted to alternate location Site CC.

In at least one embodiment, telephone system 100 connects Employee A with a company help center located at Site CC. In the exemplary embodiment, a company-wide help center located at Site BB utilizes PBX 102 for handling incoming telephone calls. The company-wide help center is configured to provide assistance to employees within the company on a variety of matters. If, for example, an employee requires assistance on a certain matter, the employee can initiate telephone call 108 by entering routing number 110 that is assigned to the company help center to discuss the matter at issue with the help center. However, because of the disaster at Site BB, routing number 110 assigned to the company help center at Site BB is no longer functional, and rather telephone call 108 is rerouted to designated Site CC so that telephone call 108 can be received by another company help center. More specifically, telephone call 108 from Employee A is routed through PBX 102 to local telephone service provider 112. Local telephone service provider 112 then routes telephone call 108 through long distance telephone service provider 116. In the exemplary embodiment, long distance telephone service provider 116 is a private, corporate, long distance telephone network. Long distance telephone service provider 116 then routes telephone call 108 to the bank 117 of telephones located at local telephone service provider 118 at Site XX. The bank of telephones 117 located at local telephone service provider 118 are configured as a hunt group. Local telephone service provider 118 then routes telephone call 108 through dedicated long distance telephone service provider 120 which routes telephone call 108 to a local telephone service provider 122 located at alternate location Site CC. Local telephone service provider 122 then routes telephone call 108 to the company help center at Site CC through at least one of another PBX 124 located at Site CC, or to one of a plurality of wireless telephones 126 that are configured into at least one hunt group. Thus, although Employee A called the company-wide help center at Site BB, Employee A is routed to another company help center located at Site CC. In another embodiment, telephone system 100 connects Employee A with an accounting department, a health service department, or other such department within the company that utilizes a PBX for handling incoming calls.

Figure 3:
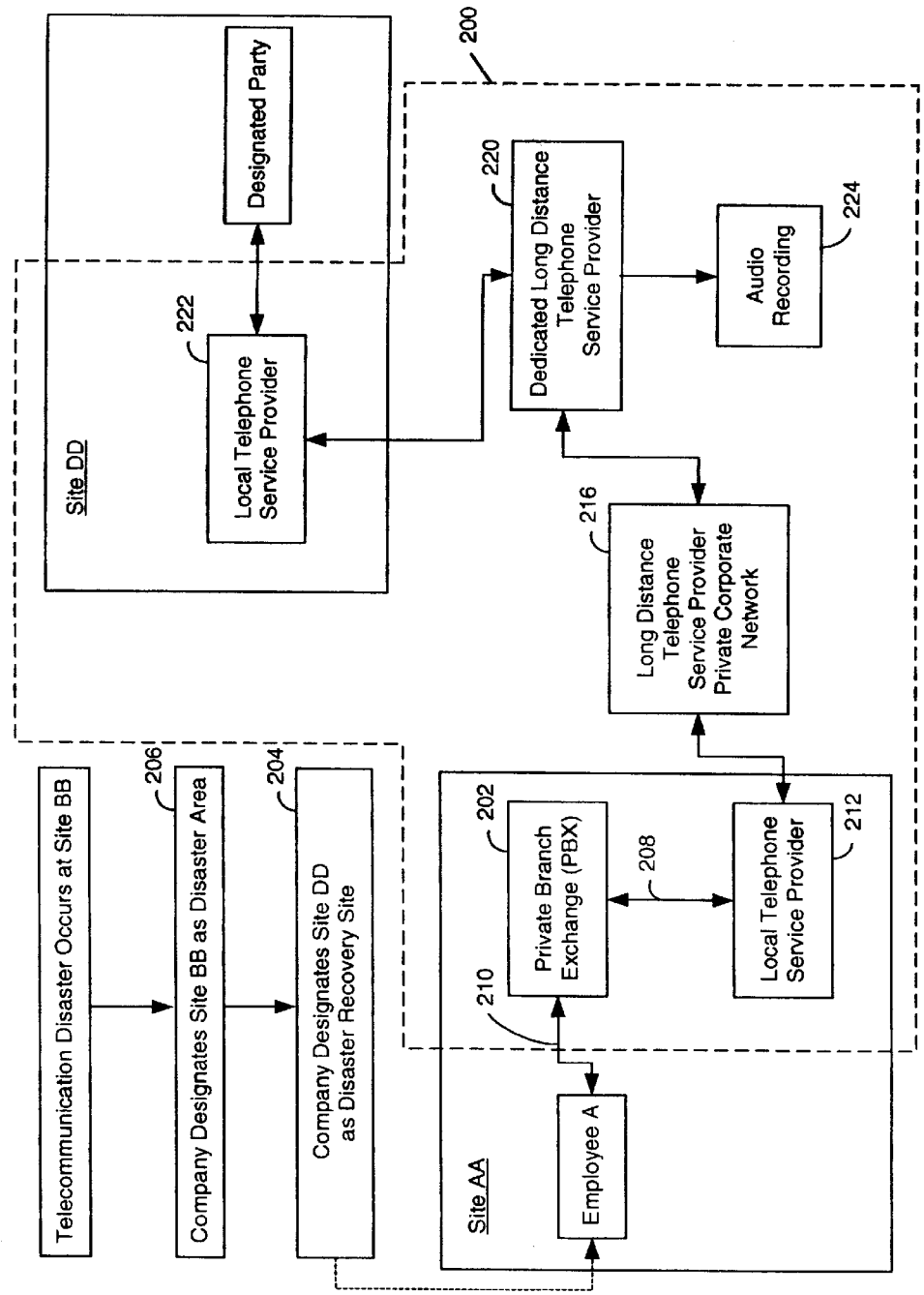
FIG. 3 is a block diagram illustrating an exemplary embodiment of a telephone system that routes a telephone call through a PBX from Employee A located at Site AA directed to an employee located at Site BB to a designated party at a disaster recovery site at Site DD.

FIG. 3 is a block diagram illustrating an exemplary embodiment of a telephone system 200 that routes a telephone call through a PBX 202 from Employee A located at Site AA directed to an employee located at Site BB to a designated party located at a disaster recovery site 204 at Site DD. In the exemplary embodiment, disaster recovery site 204 is a temporary telecommunication site that is established after a disaster occurs, such that telephone calls directed to a designated disaster area may be rerouted to disaster recovery site 204. Disaster recovery site 204 is typically located in close proximity to the disaster area. For example, if Site BB is designated a disaster area 206, telephone calls directed to Site BB through PBX 202 are rerouted to an alternate location Site CC (shown in FIG. 2) until disaster recovery site 204 is established. After disaster recovery site 204 is established, telephone calls directed to Site BB through PBX 202 are then rerouted to disaster recovery site 204.

In the exemplary embodiment, following a disaster at Site BB, and Site BB being designated as disaster area 206, the company then establishes disaster recovery site 204 at Site DD to receive telephone calls that are directed to Site BB through PBX 202. In other words, all telephone calls directed to Site BB through nonfunctional routing numbers within PBX 202 are redirected to disaster recovery site 204.

In the exemplary embodiment, without knowing that Site BB has been designated disaster area 206, Employee A located at Site AA places a telephone call 208 to an employee located at Site BB by entering a routing number 210 assigned to the employee within PBX 202 into a telephone. However, because of the disaster at Site BB, routing number 210 assigned to the employee at Site BB is no longer functional, and rather telephone call 208 is rerouted to disaster recovery site 204 at Site DD so that telephone call 208 can be received by a designated person. More specifically, in the exemplary embodiment, telephone call 208 from Employee A is routed through PBX 202 to a local telephone service provider 212 which is local to Employee A at Site AA. Local telephone service provider 212 then routes telephone call 208 through a long distance telephone service provider 216. In the exemplary embodiment, long distance telephone service provider 216 is a private corporate telephone network. Long distance telephone service provider 216 then routes telephone call 208 to a dedicated long distance telephone service provider 220. In the exemplary embodiment, dedicated long distance telephone service provider 220 is a toll-free, long distance telephone service provider which routes telephone call 208 to a local telephone service provider 222 located near disaster recovery site 204 at Site DD. Local telephone service provider 222 then routes telephone call 208 to a designated party located at disaster recovery site 204 at Site DD. Employee A is then able to speak via the telephone with a designated party at disaster recovery site 204 at Site DD.

Additionally, in an exemplary embodiment, when telephone call 208 is routed to dedicated long distance telephone service provider 220, an audio recording 224 is provided to Employee A. In at least one embodiment, audio recording 224 advises the callers that Site BB has been designated a disaster area 206, and that telephone call 208 is being rerouted to disaster recovery site located at Site DD.

In at least one embodiment, telephone system 200 connects Employee A with a company help center located at disaster recovery site 204 at Site DD. In the exemplary embodiment, a company-wide help center located at Site BB utilizes PBX 202 for handling incoming telephone calls. The company-wide help center is configured to provide assistance to employees within the company on a variety of matters. If, for example, an employee requires assistance on a certain matter, the employee can initiate telephone call 208 by entering routing number 210 that is assigned to the company help center to discuss the matter at issue with the help center. However, because of the disaster at Site BB, routing number 210 assigned to the company help center at Site BB is no longer functional, and rather telephone call 208 is rerouted to disaster recovery site 204 at Site DD so that telephone call 208 can be received by another company help center. More specifically, telephone call 208 from Employee A is routed through PBX 202 to local telephone service provider 212. Local telephone service provider 212 then routes telephone call 208 through long distance telephone service provider 216. In the exemplary embodiment, long distance telephone service provider 216 is a private corporate telephone network. Long distance telephone service provider 216 then routes telephone call 208 to dedicated long distance telephone service provider 220 which routes telephone call 208 to local telephone service provider 222 located near disaster recovery site 204 at Site DD. Local telephone service provider 222 then routes telephone call 208 to a company help center located at disaster recovery site 204 at Site DD. Thus, although Employee A called the company-wide help center at Site BB, Employee A is routed to another company help center located at disaster recovery site 204 at Site DD. In another embodiment, telephone system 200 connects Employee A with an accounting department, a health service department, or other such department within the company that utilizes a PBX for handling incoming calls.

In the exemplary embodiment, once disaster area 206 is no longer designated a disaster area and the routing numbers assigned within PBX 202 are functional again, telephone system 200 is rerouted such that telephone system 200 routes the telephone calls to Site BB as described in FIG. 1.

At least some companies having offices at various locations utilize a PBX for handling incoming and outgoing telephone calls. A PBX is a telephone controller that switches calls between users on internal lines while allowing all users to share a certain number of external phone lines. A PBX eliminates requiring an external line for each user. If, however, a telecommunication disasters occurs involving a company's PBX, a company may experience significant rerouting problems costing the company time and money. Therefore, the present invention describes a method and system that allows a company utilizing a PBX to reroute telephone calls directed through a PBX located in a designated disaster area having nonfunctional routing numbers to a designated person at an alternate location. Additionally, once a disaster recovery site is established, the present invention allows a company utilizing a PBX to reroute telephone calls directed through the PBX located in the designated disaster area to the disaster recovery site. Lastly, once the disaster area is no longer designated a disaster area and the routing numbers assigned to the PBX are functional again, the present invention allows a company utilizing a PBX to return the telephone routing system back to its original state.

While the invention has been described in terms of various specific embodiments, those skilled in the art will recognize that the invention can be practiced with modification within the spirit and scope of the claims.

What is claimed is:

1. A method of rerouting telephone calls directed to a private branch exchange (PBX) located at a first site to a second site wherein the PBX has at least one nonfunctional routing number, said method comprising:
    providing a corporate long distance telephone system;
    providing a telephone hunt group;
    programming a plurality of routing numbers assigned to the first site PBX such that calls directed to the first site PBX are routed through the corporate long distance telephone system to the telephone hunt group;
    programming the hunt group to forward calls to a dedicated long distance telephone network; and
    programming the dedicated long distance telephone network to route calls to at least one of an alternate PBX and a dedicated wireless telephone system located at the second site.

2. A method in accordance with claim 1 further comprising:
    providing a designated local telephone system located at a third site;
    reprogramming the corporate long distance telephone system to route calls to the dedicated long distance telephone network; and
    verifying a new call path by making at least one call to a routing number assigned to the first site PBX.

3. A method in accordance with claim 2 further comprising:
    providing a designated event;
    reprogramming the plurality of routing numbers assigned to the first site PBX after an occurrence of the designated event such that calls directed to the first site PBX are directed to the first site PBX; and
    verifying a new call path by making at least one call to a routing number assigned to the first site PBX.

4. A method in accordance with claim 1 wherein programming the telephone hunt group comprises programming the telephone hunt group to forward calls to a dedicated, toll-free, long distance telephone system.

5. A method in accordance with claim 1 wherein programming the dedicated long distance telephone network further comprises providing an audio recording on the dedicated long distance telephone network such that a caller hears an audio message when the caller is forwarded to the dedicated long distance telephone network.

6. A method in accordance with claim 1 wherein programming the dedicated long distance telephone network further comprises programming the dedicated long distance telephone network to route calls to at least one of an alternate PBX and at least one wireless telephone hunt group.

7. A method in accordance with claim 3 wherein providing a designated event comprises causing the nonfunctional first site PBX routing numbers to become functional.

8. A method of rerouting telephone calls directed to a private branch exchange (PBX) located in a designated disaster area to an alternate site, the PBX having at least one nonfunctional routing number, said method comprising:
    providing a corporate long distance telephone system;
    providing a bank of telephones configured in a hunt group;
    programming a plurality of routing numbers assigned to the PBX located in the disaster area such that calls directed to the PBX located in the disaster area are routed through the corporate long distance telephone system to the bank of hunt group telephones;
    programming the bank of hunt group telephones to forward calls to a dedicated long distance telephone network; and
    programming the dedicated long distance telephone network to route calls to at least one of an alternate PBX and a dedicated wireless system located at the alternate site such that a designated person receives the calls.

9. A method in accordance with claim 8 further comprising:
    establishing a disaster recovery site in close proximity to the disaster area;
    providing a designated local telephone system located near the disaster recovery site;
    reprogramming the corporate long distance telephone system to route calls to the dedicated long distance telephone network; and
    verifying a new call path by making at least one call to a routing number assigned to the PBX located in the disaster area.

10. A method in accordance with claim 9 further comprising:
    designating the disaster area a non-disaster area;
    reprogramming the plurality of routing numbers assigned to the PBX located in the non-disaster area such that calls directed to the PBX located in the non-disaster area are directed to the PBX located in the non-disaster area; and
    verifying a new call path by making at least one call to a routing number assigned to the PBX located in the non-disaster area.

11. A method in accordance with claim 8 wherein programming the bank of hunt group telephones comprises programming the bank of hunt group telephones to forward calls to a dedicated, toll-free, long distance telephone system.

12. A method in accordance with claim 8 wherein programming the dedicated long distance telephone network further comprises providing an audio recording on the dedicated long distance telephone network such that a caller hears an audio message when the caller is forwarded to the dedicated long distance telephone network.

13. A method in accordance with claim 8 wherein programming the dedicated long distance telephone network further comprises programming the dedicated long distance telephone network to route calls to at least one of an alternate PBX and at least one wireless hunt group.

14. A method in accordance with claim 8 wherein programming a plurality of routing numbers assigned to the PBX located in the disaster area further comprises programming a plurality of routing numbers assigned to a company-wide help center located in a designated disaster area such that telephone calls directed to the company-wide help center are routed through the corporate long distance telephone system to the bank of hunt group telephones.

15. A telephone routing system for rerouting telephone calls directed to a private branch exchange (PBX) located at a first site to a second site, said first site PBX having at least one nonfunctional routing number, said system comprising a corporate long distance telephone system, a bank of telephones configured in a hunt group and configured to receive calls from said corporate long distance telephone system, a dedicated long distance telephone network configured to receive calls from said hunt group, and at least one of an alternate PBX and a dedicated wireless system located at said second site configured to receive calls from said dedicated long distance telephone network.

16. A system in accordance with claim 15 wherein said corporate long distance telephone system comprises a private, corporate, long distance telephone system.

17. A system in accordance with claim 15 wherein said system configured to reroute calls directed to said first site PBX through said corporate long distance telephone system to said bank of hunt group telephones.

18. A system in accordance with claim 17 wherein said system further configured to forward calls from said bank of hunt group telephones to said dedicated long distance telephone network.

19. A system in accordance with claim 18 wherein said system further configured to route calls from said dedicated long distance telephone network to at least one of said alternate PBX and said dedicated wireless system located at said second site.

20. A system in accordance with claim 17 further comprising a designated local telephone system located in close proximity to a third site, said system further configured to route calls from said corporate long distance telephone system through said dedicated long distance telephone network to said designated local telephone system near said third site.

21. A system in accordance with claim 15 further comprising a designated event, said system further configured to route calls directed to said first site PBX to said first site PBX after an occurrence of said designated event.

22. A system in accordance with claim 21 wherein said designated event comprises said nonfunctional first site PBX routing numbers becoming functional.

23. A system in accordance with claim 15 wherein said dedicated long distance telephone network further comprises a toll-free system.

24. A system in accordance with claim 15 wherein said dedicated long distance telephone network comprises an audio recording such that a caller hears an audio message when the caller is forwarded to the dedicated long distance telephone network.

25. A system in accordance with claim 15 wherein said dedicated wireless system comprises at least one wireless telephone hunt group.

26. A telephone routing system for rerouting telephone calls directed to a private branch exchange (PBX) located in a disaster site area to an alternate site, said disaster site PBX having a plurality of routing numbers assigned thereto and at least one routing number designated as nonfunctional, said system comprising a corporate long distance telephone system, a bank of telephones configured in a hunt group, a dedicated long distance telephone network, and at least one of an alternate PBX and a dedicated wireless system located near said alternate site, said system configured to reroute calls directed to said disaster site PBX through said corporate long distance telephone system to said bank of hunt group telephones, forward calls from said bank of hunt group telephones to said dedicated long distance telephone network, and route calls from said dedicated long distance telephone network to at least one of said alternate PBX and said dedicated wireless system located near said alternate site.

27. A system in accordance with claim 26 further comprising a designated local telephone system located in close proximity to a disaster recovery site, said system further configured to route calls from said corporate long distance telephone system through said dedicated long distance telephone network to said designated local telephone system near said disaster recovery site.

28. A system in accordance with claim 27 further configured to route calls directed to said disaster site PBX to said disaster site PBX after said nonfunctional routing numbers become functional.

* * * * *